(12) United States Patent
Fourney et al.

(10) Patent No.: US 12,139,350 B2
(45) Date of Patent: Nov. 12, 2024

(54) APPARATUS AND METHODS FOR DYNAMICALLY CONTROLLING THE SPACING OF CONVEYED OBJECTS

(71) Applicant: Laitram, L.L.C., Harahan, LA (US)

(72) Inventors: Matthew L. Fourney, Laurel, MD (US); Robert K. Paquin, Nottigham, MD (US); James L. Brun, Forest Hill, MD (US); Christopher B. Spicer, Silver Spring, MD (US); David L. Marsh, Pasadena, MD (US)

(73) Assignee: Laitram L.L.C., Harahan, LA (US)

( * ) Notice: Subject to any disclaimer, the term of this patent is extended or adjusted under 35 U.S.C. 154(b) by 0 days.

(21) Appl. No.: 18/376,263

(22) Filed: Oct. 3, 2023

(65) Prior Publication Data

US 2024/0025667 A1    Jan. 25, 2024

Related U.S. Application Data (62) Division of application No. 17/360,234, filed on Jun. 28, 2021, now Pat. No. 11,807,473.

(Continued)

(51) Int. Cl.
*B65G 47/88* (2006.01)
*B65G 19/26* (2006.01)
*B65G 47/29* (2006.01)

(52) U.S. Cl.
CPC ....... *B65G 47/8823* (2013.01); *B65G 19/265* (2013.01); *B65G 47/88* (2013.01); *B65G 47/295* (2013.01); *B65G 47/8892* (2013.01)

(58) Field of Classification Search
CPC .. B65G 47/8823; B65G 19/265; B65G 47/88; B65G 47/295; B65G 47/8892;
(Continued)

(56) References Cited

U.S. PATENT DOCUMENTS 2,443,010 A    6/1948  Petskeyes
3,100,566 A *  8/1963  Hinchcliffe ............ B65G 15/44
                                              198/699

(Continued)

FOREIGN PATENT DOCUMENTS

FR    3073382 A1    5/2019
IT    1163831 B     4/1987

(Continued)

OTHER PUBLICATIONS

Partial International Search Report of PCT/US2021/039347 by ISA/EP, mailed Oct. 14, 2021, European Patent Office, Rijswijk, NL.

(Continued)

*Primary Examiner* — Mark A Deuble
(74) *Attorney, Agent, or Firm* — Catherine M. Bishop (57) ABSTRACT

A conveying system employs independently controlled flights. The flights are controlled separately from a conveying surface using a linear transport system. The linear transport system allow the position of the flights to be controlled based on a parameter, such as the length of a conveyed object. The flights are pivotally mounted to a mover of the linear transport system and can pivot relative to the conveying surface to allow the flights to fit in a space between an end of carryway and a receptacle.

15 Claims, 9 Drawing Sheets

Related U.S. Application Data (60) Provisional application No. 63/049,790, filed on Jul. 9, 2020.

(58) Field of Classification Search
CPC .......... B65G 19/225; B65G 2201/0238; B65G 2201/0285; B65G 47/28; B65G 54/02; B65H 2511/22; B65H 5/021; B65H 5/16
See application file for complete search history.

(56) References Cited

U.S. PATENT DOCUMENTS

| | | | |
|---|---|---|---|
| 3,845,852 A | 11/1974 | Langen et al. | |
| 4,143,759 A | 3/1979 | Paradis | |
| 4,185,443 A | 1/1980 | Budzyn | |
| 4,330,934 A * | 5/1982 | Denner | B65G 19/02 29/726 |
| 4,366,898 A * | 1/1983 | Bobrysheva | B65G 17/42 198/692 |
| 5,070,679 A | 12/1991 | Lakey | |
| 5,137,140 A | 8/1992 | Lecrone | |
| 6,332,531 B1 * | 12/2001 | Damkjaer | B65G 17/126 198/690.2 |
| 6,467,610 B1 * | 10/2002 | MacLachlan | B65G 17/32 198/853 |
| 7,537,105 B2 * | 5/2009 | Fourney | B65G 47/841 198/732 |
| 7,726,461 B2 | 6/2010 | Risley | |
| 7,752,828 B2 | 7/2010 | Gudim et al. | |
| 7,775,345 B2 * | 8/2010 | Fourney | B65G 47/266 198/779 |
| 8,096,409 B2 | 1/2012 | Wipf et al. | |
| 8,430,232 B2 | 4/2013 | Baldanza et al. | |
| 8,776,985 B2 | 7/2014 | Huettner et al. | |
| 8,944,236 B2 * | 2/2015 | Fourney | B65G 47/8823 198/779 |
| 9,051,132 B2 | 6/2015 | van de Loecht et al. | |
| 9,061,838 B2 | 6/2015 | van de Loecht et al. | |
| 9,073,703 B2 | 7/2015 | Fourney | |
| 10,280,012 B2 * | 5/2019 | Alexanderson | B65G 19/10 |
| 10,287,105 B2 | 5/2019 | Hayashi et al. | |
| 10,894,672 B2 | 1/2021 | Ford et al. | |
| 11,117,748 B1 * | 9/2021 | De Graw | B65G 17/16 |
| 2012/0241292 A1 | 9/2012 | Fourney | |
| 2014/0083817 A1 | 3/2014 | van de Loecht et al. | |
| 2014/0339051 A1 | 11/2014 | Fourney | |
| 2021/0114819 A1 | 4/2021 | Wipf et al. | |
| 2021/0323773 A1 | 10/2021 | Boarin | |

FOREIGN PATENT DOCUMENTS

| | | |
|---|---|---|
| JP | 2017071479 A | 4/2017 |
| WO | 2014111091 A1 | 7/2014 |
| WO | 2016118069 A1 | 7/2016 |

OTHER PUBLICATIONS

International Search Report and Written Opinion of the International Searching Authority, PCT/US2021/039347, mailed Jan. 20, 2022, European Patent Office, Rijswijk, NL.

* cited by examiner

APPARATUS AND METHODS FOR DYNAMICALLY CONTROLLING THE SPACING OF CONVEYED OBJECTS

RELATED APPLICATIONS

The present application is a divisional of U.S. patent application Ser. No. 17/360,234, filed Jun. 28, 2021, which claims priority to Provisional U.S. Patent Application Ser. No. 63/049,790, filed Jul. 9, 2020, both entitled "Apparatus and Methods for Dynamically Controlling the Spacing of Conveyed Objects", the contents of which are herein incorporated by reference.

BACKGROUND OF THE INVENTION

The present invention relates to the field of power-driven conveyors. More particularly, the invention relates to a system and method for controlling the spacing of conveyed objects.

It is often desirable to space conveyed objects in a selected manner along the travel direction of a conveyor, such as a conveyor belt. The spacing enables downstream processing, such as sorting by diverting of selected objects onto an exit conveyor. For example, it may be desirable to have only one package on a section of a conveying system, such as a diverter, at a time. If the packages are of different sizes, such as often occurs in the shipping industry, then the spacing of packages should be varied in order to ensure that only one package is on the selected section at a time, while maintaining the smallest possible gap between packages. In addition, non-regular packages, such as envelopes and bags may be difficult for flights used to space the conveyed objects to operate.

SUMMARY OF THE INVENTION

A conveying system employs dynamically assignable flights that are controlled separately from a conveying surface. The conveying system includes a dynamic gapping conveyor for spacing conveyed objects in a selected manner. The dynamic gapping conveyor uses flights independently driven by a linear transport system to control the spacing between conveyed objects.

According to one aspect, a dynamic gapping conveyor, comprises a frame forming a carryway for a conveying surface, a conveying surface extending in a conveying direction from a first end to a second end and laterally from a first side edge to a second side edge, a linear transport system and a flight extending laterally across the conveying surface. The linear transport system comprises an endless rail extending along a first side edge of the conveying surface and a plurality of movers. The endless rail houses a plurality of inducers that interact with the movers to move the movers along the endless rail. The flight has a first end connected to a mover on a first side of conveying surface.

According to another aspect, a flight for a conveyor comprises a flight body rotatably mounted on a mounting bar, a mounting assembly receiving the mounting bar to pivotally mount the flight body to a mover of a linear transport system and a pivot mechanism for selectively pivoting the flight body relative to the mover.

According to another aspect, a flight for a conveyor comprises a tubular base for pivotally receiving a mounting bar, a tapering body portion extending from the base having a front surface and a rear surface and a curved tip extending from the rear surface including openings in a terminal edge to form fingers.

DETAILED DESCRIPTION OF THE INVENTION

A conveying system includes a dynamic gapping conveyor to dynamically control the spacing between objects being transported through the conveying system. The dynamic gapping conveyor uses flights that are independently driven to control the spacing between conveyed objects. The present invention will be described below relative to certain illustrative embodiments. Those skilled in the art will appreciate that the present invention may be implemented in a number of different applications and embodiments and is not specifically limited in its application to the particular embodiments depicted.

Figure 1:
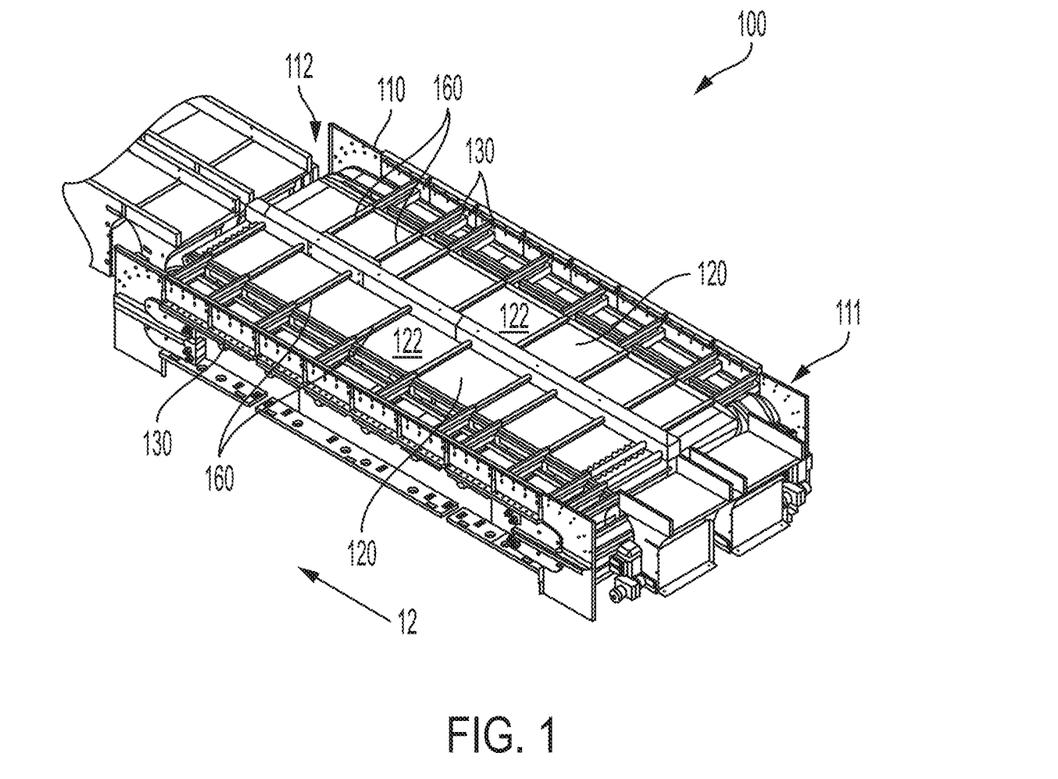
FIG. 1 is an isometric view of a conveying system including dynamically assignable flights according to an embodiment of the invention.
Figure 2:
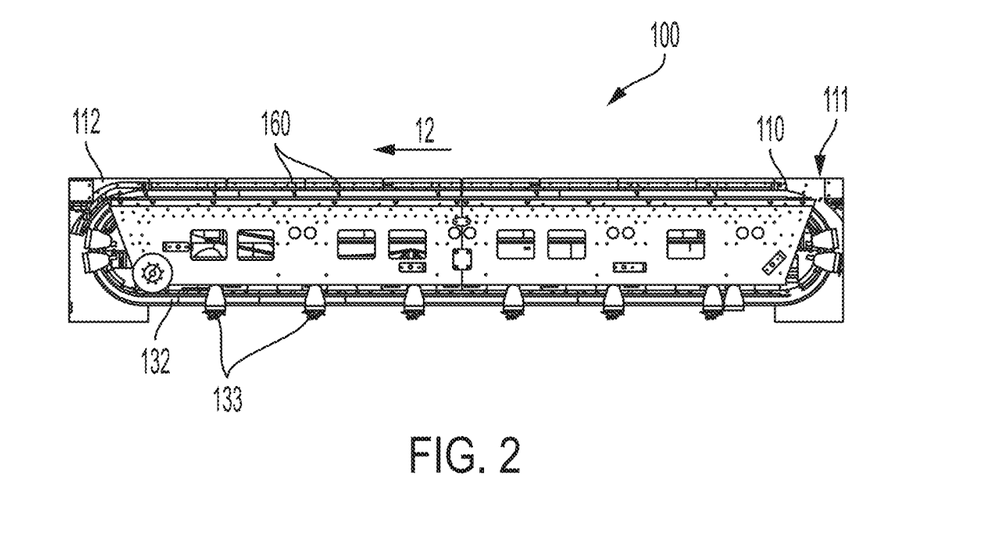
FIG. 2 is a side view of the conveying system of FIG. 1.

FIGS. 1 and 2 show a dynamic gapping conveying system 100 including a frame 110 extending from a first end 111 to a second end 112 and forming a carryway for a conveyor 120 that moves objects from the first end 111 to the second end 112. The illustrative system 100 includes two side-by-side conveyors 120, but can include a single or more conveyors. A dynamic gapping system 130 runs concurrent with each conveyor 120 and includes independent flights 160 for spacing objects conveyed by the conveyor. For example, the dynamic gapping system 130 may control and maintain a consistent gap between packages of different sizes to increase throughput. The dynamic gapping system 130 comprises a linear transport system connected to a plurality of flights 160 that extend laterally over the conveyor conveying surface 122. The illustrative flights 160 are controlled separately from the conveying surface 122.

The illustrative conveyor 120 comprises as an endless conveyor belt 120 trained around guide devices at each end 111, 112 of the frame, defining a top conveying surface 122 and forming a returnway below the carryway to form a complete circuit. A driver, such as a sprocket driven by a motor, moves the conveyor belt 120 through the circuit to move objects from the first end 111 to the second end 112 of the frame 110. The illustrative system comprises two endless conveyor belts side-by-side, but the invention is not so limited. Each conveyor carryway extends longitudinally from the first end 111, which is the receiving end, to the second end 112, which is the discharge end, and laterally in width from a first side edge to a second side edge.

The invention is not limited to a conveyor belt for conveying objects, and any suitable means for conveying objects may be used.

The dynamic gapping system 130 includes a plurality of flights 160 extending laterally across the width, or a portion of the width, of the conveying surface 122, perpendicular to the conveying direction 12, for guiding conveyed objects. The flights 160 serve as stops to limit the travel of objects, such as packages, to control their relative spacing on the conveying surface.

In an illustrative embodiment of the invention, the flights 160 are driven independently from the conveying surface 122 and, in certain embodiments, each other. The flights 160 may be separated by a variable separation distance, which allows the flights 160 to be used to independently vary object spacing. The position of the flights 160 is longitudinally adjustable relative to the conveying surface 122 and-or each flight 160 may travel at a different speed than the conveying surface 122.

In one embodiment, the flights 160 are driven by a linear transport system, comprising a plurality of movers 133 connected to the flights 160 and a motor module for propelling the movers, with each mover individually controlled. As shown in FIG. 2, each motor module comprises an endless, obround-shaped rail 132 on each side of the conveyor belt, substantially matching and adjacent the path of the conveyor belt 120, though the invention is not so limited. Alternatively, the rail 132 could return along a different path, such as above or outside of the carryway. The illustrative rail 132 includes inducers, such as embedded electromagnetic coils or other elements, that cooperate with elements, such as magnetic plates, in the movers 133 to propel the movers through the circuit formed by the rail 132 at a controlled and variable pace. Suitable linear transport systems are available from Rockwell Automation (the iTRACK® intelligent track system), Beckhoff Automation LLC of Savage, MN, B&R Automation of Eggelsberg, Austria, FESTO Corporation of Germany and other linear transport system providers known in the art.

Figure 3:
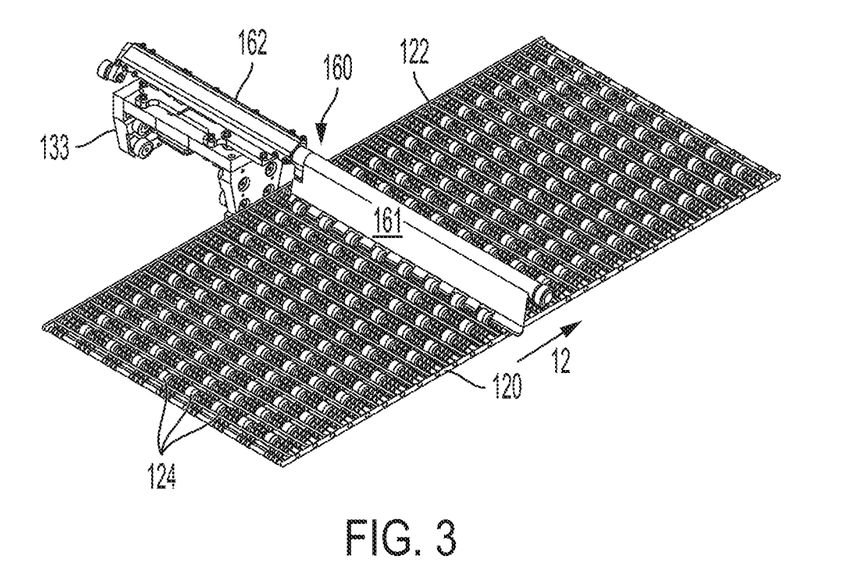
FIG. 3 is an isometric view of a portion of the conveying system of FIG. 1, showing a flight relative to a conveying surface.
Figure 4:
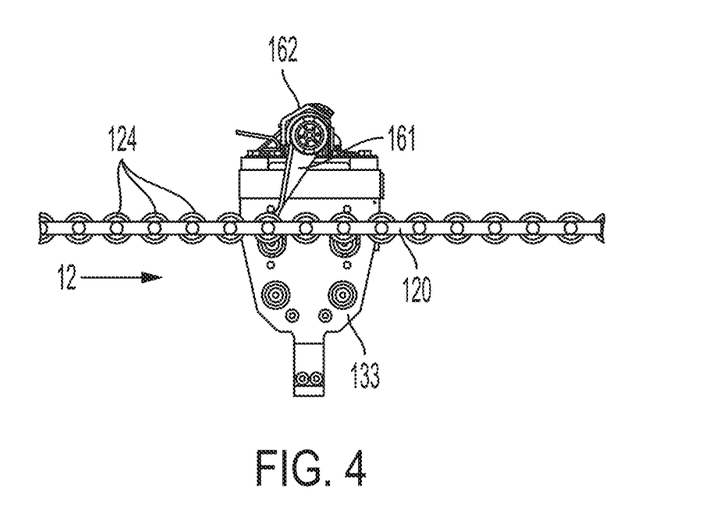
FIG. 4 is a side view of the portion of FIG. 3.
Figure 5:
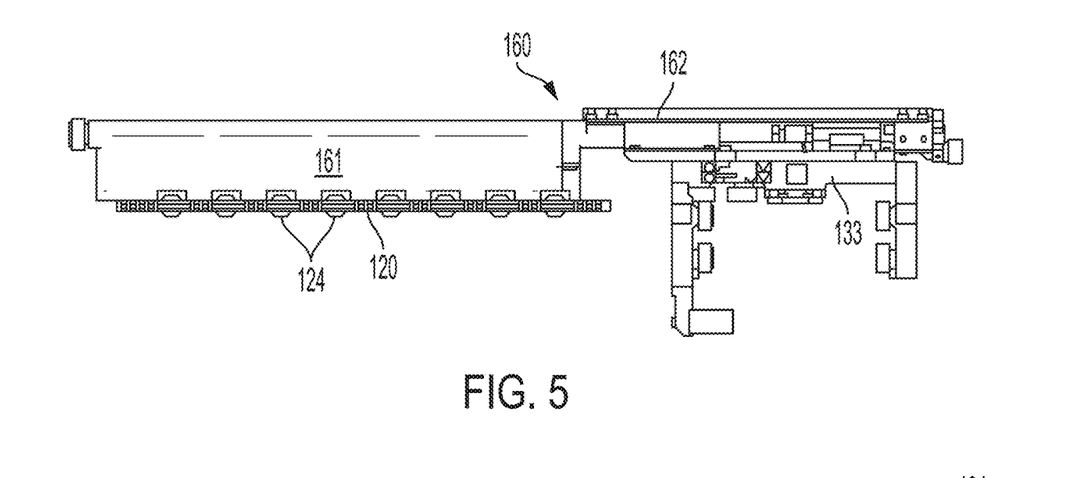
FIG. 5 is a front view of the portion of FIG. 3.

Referring to FIGS. 3-5, each illustrative flight 160 comprises a body portion 161 and a mounting portion 162 that connects the body portion 161 to a mover 133 of the linear transport system so that when the mover 133 travels along the rail 132, the connected body portion 161 moves, too, creating dynamically assignable flights across the conveying surface 122. The mounting portion 162 is configured to place the body portion 161 over the conveying surface 122 of an associated conveyor belt 120, or other conveying surface, in a selected orientation to stop forward-moving objects. Alternatively, the body portion 161 can push an object on the conveying surface forward or backwards. In one embodiment, the body portion 161 is pivotally mounted to the mover 133 to allow the body portion 161 to pivot relative to the mover 133 and the conveying surface 122, as described below.

The illustrative conveying surface 122 includes a plurality of rollers 124, and the body portion 161 of the flight 160 is configured to accommodate the rollers 124. The rollers 124 have axes perpendicular to the direction of travel 12 of the dynamic gapping conveyer 100. In the illustrative embodiment, the rollers 124 are arranged in longitudinally columns, with the pattern extending laterally across the width of the conveyor belt 120 though the invention is not so limited, and the rollers 124 can have any suitable pattern. In addition, the invention is not limited to a conveyor comprising a conveyor belt with rollers embedded therein, but may encompass a conveyor comprising powered rollers, rollers connected to chains at each end, or any suitable conveyor known in the art. The invention is also not limited to a conveying surface formed by rollers. For example, the conveying surface may comprise a material that allows objects to slide across the conveying surface with the flights 160 enabling adjustment of their position on the conveying surface 122.

The rollers 124 may be activated, through any suitable means, to propel conveyed objects forward faster than the speed of the conveyor belt 120, with the flights forming stops to selectively space and—or gap the objects relative to each other along the carryway. The flights 160 enable consistent spacing between conveyed objects, if desired, regardless of the varying lengths of the conveyed objects. An example of a suitable conveyor belt with rollers is the Activated Roller Belt™ conveyor belt available from Intralox, LLC, of Harahan, LA, but other suitable conveyor belts may be used.

Figure 6:
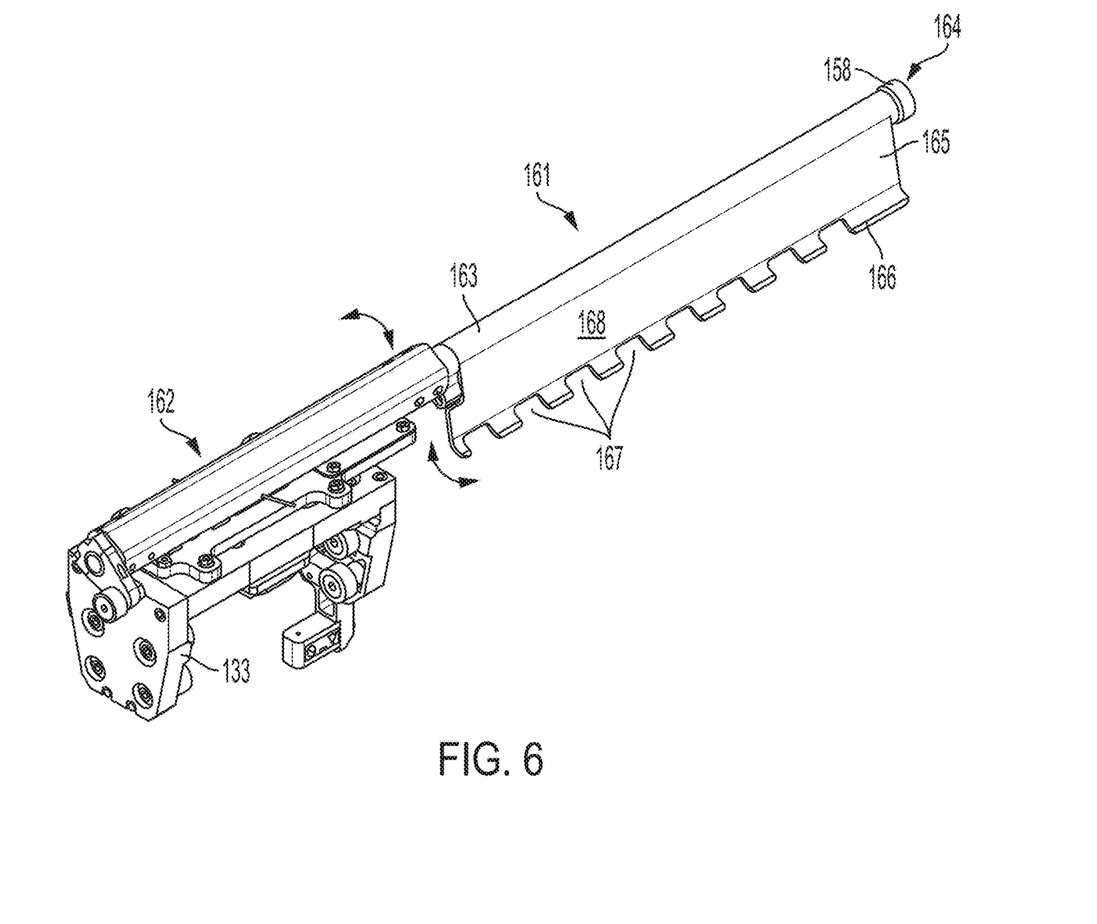
FIG. 6 is an isometric view of a flight and connected mover of a conveying system of an embodiment of the invention.
Figure 7:
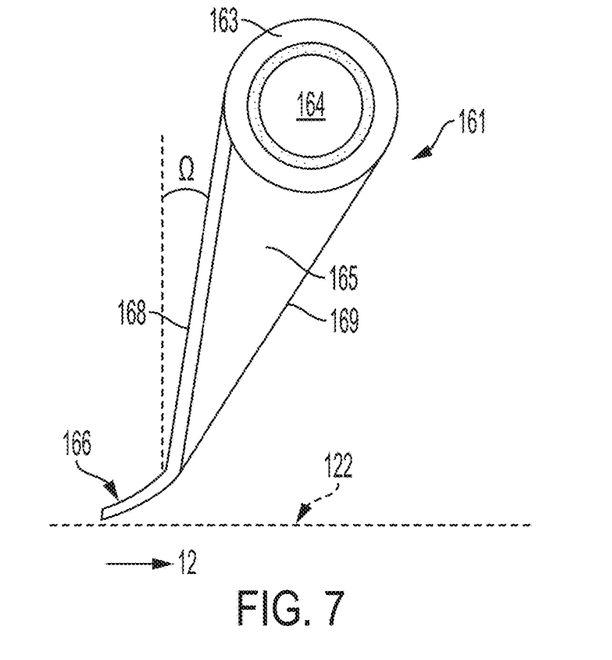
FIG. 7 is a side view of a flight of an embodiment of the invention.
Figure 8:
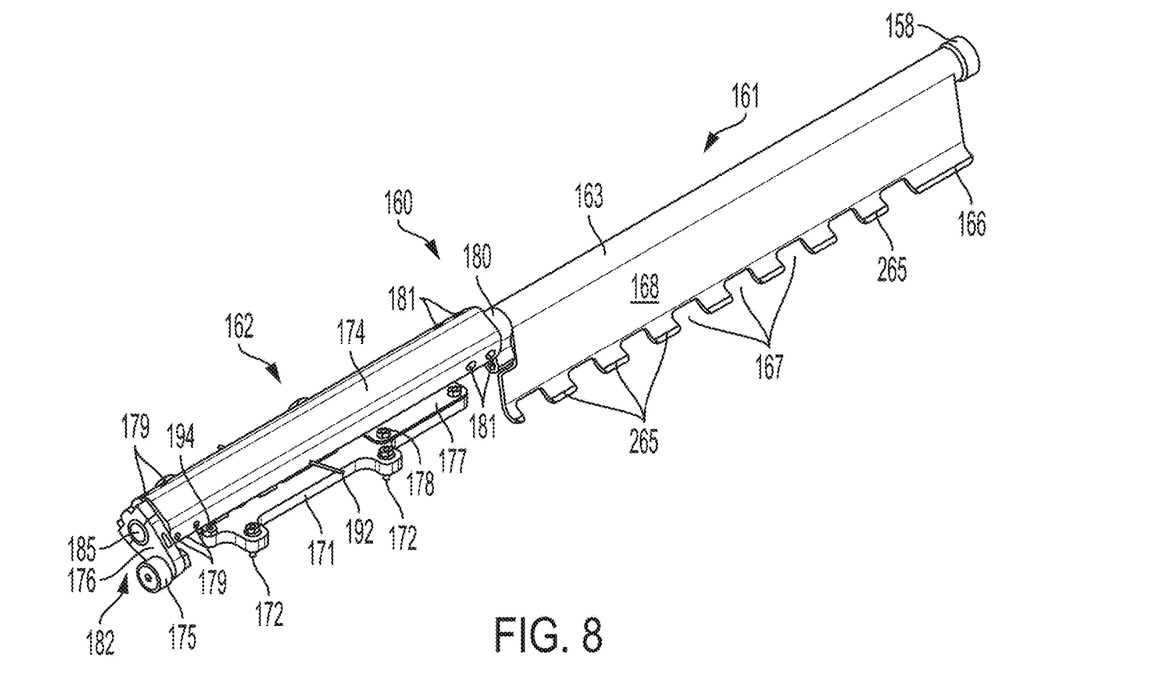
FIG. 8 is an isometric view of a flight of an embodiment of the invention.

Referring also to FIGS. 6-8, the body portion 161 of the flight comprises a base 163 configured to receive a mounting bar 164, a tapering body portion 165 having a front surface 169 and a rear surface 168, and a curved tip 166 curving away from the end of the rear surface 168. The illustrative base 163 is configured to rotate about the mounting bar 164, as described below, but alternatively, the base can be fixed relative to the mounting bar 164. The illustrative mounting bar 164 comprises a carbon fiber tube or rod, but the invention is not so limited. The illustrative flight 160 further includes an end cap 158, but the invention is not so limited. The body portion 161 is sufficiently stiff to be able to withstand impact from a conveyed object. A plurality of openings 167 in the terminal edge of the curved tip 166 accommodate the rollers 124 in the conveyor. The body portion 161 is sized and configured so that the solid fingers 265 between the openings 167 of the curved portion 166 fit into and lie directly above or in light contact with the non-roller portions of the conveying surface 122 between the rollers 124. The curved fingers 265 of the tip 166 preferably reach below the rollers, upon which packages ride, and are therefore lower than the leading edge of conveyed packages. In the carryway, the mounting portion 162 is disposed in an active position, placing the body portion 161 at an angle relative to the conveying surface, as shown in FIGS. 3, 4 and 8. In one embodiment, the body portion 161 is angled forward, so that the rear surface 168 extends at an angle $\Omega$ between about 1° and about 15° and preferably between about 5° and about 10° relative to vertical, with the curved tip 166 trailing, forming a scoop-like structure, but the invention is not so limited. Alternatively, the flight body 161 could be vertical or angled rearward to facilitate pushing conveyed objects. The illustrative geometry prevents polybags or small envelops pushed forward into the flight from getting caught between the flight and conveyor belt by slightly lifting a pushed packed up, but the angle of the flight and particular geometry can vary depending on the product being conveyed.

The body portion 161 of the flight can be formed of any suitable material through any suitable process to produce a structure that is durable and light weight. For example, the body portion 161 may be 3-D printed using plastic. Examples of suitable plastics include nylon, nylon mixed with chopped carbon fiber, polypropylene, acrylonitrile butadiene styrene (ABS), and other materials known in the art. The body portion 161 could alternatively be injection or compression molded, machined or formed through any other suitable manufacturing process.

The illustrative body member 161 is pivotally connected to the mover 133 via the mounting portion 162 to allow the body member 161 to pivot or otherwise shift relative to the conveying surface 122. For example, the body member 161 may pivot at the end 112 of the carryway to allow the flight 160 to fit in the space between the end 112 of the carryway and a receiving conveyor or other receptacle. In one embodiment, a cam may be used to selectively pivot the body member 161, though other suitable mechanisms for selectively pivoting the body member 161 may be used.

Figure 9:
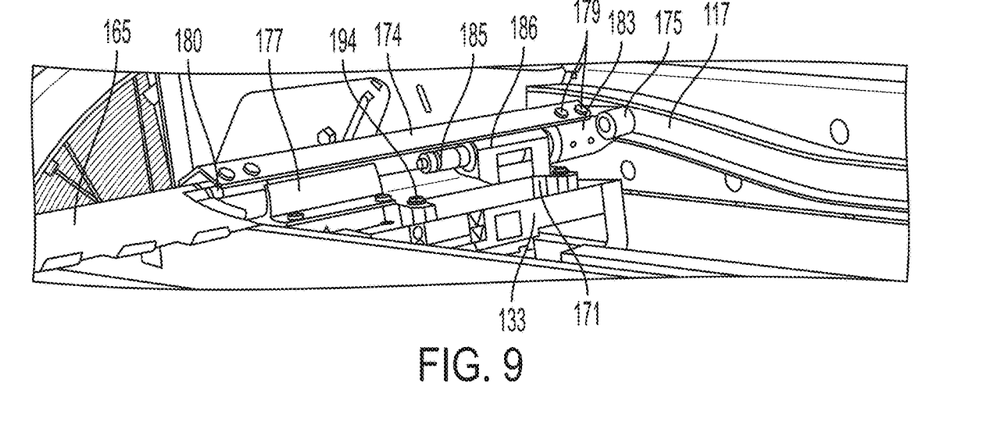
FIG. 9 is an isometric view of a flight in a pivoted position at an end of a carryway according to an embodiment of the invention.
Figure 10:
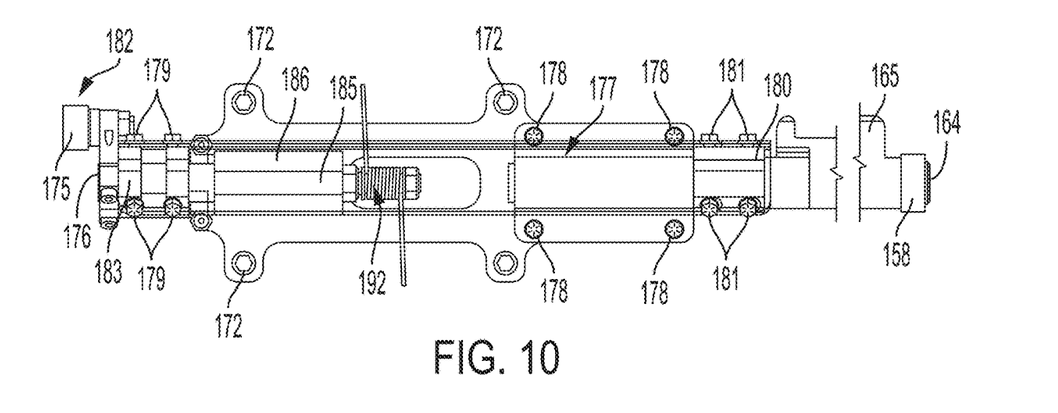
FIG. 10 is a bottom view of the flight of FIG. 8.

Referring to FIGS. 8-10, the mounting portion 162 comprises a base plate 171 for mounting the flight assembly 160 to a mover 133 using fasteners 172 inserted through aligned openings or another suitable fastening mechanism. A sheath 174, which may be formed of bent sheet metal, forms a housing that covers and connects the components of the mounting portion 162. At a first end, the sheath 174 receives and is fixed to a mounting seat 180 connected to the flight body using fasteners 181. The mounting seat 180 serves as an adapter for the fight body 161 to allow connection of the sheath 174 to the flight body 161. The illustrative mounting seat 180 includes an opening forming a bearing for allowing the mounting bar 164 to extend therethrough without interference. The mounting seat 180 includes a shaped protrusion (not shown) that is received in a recess in the edge of the flight body to fix the mounting seat 180 to the flight body, so that rotation of the sheath 174 causes rotation of the flight body 161. Any suitable means for fixing the sheath 174 to the flight body 161 may be used.

The illustrative mounting bar 164 passes through the mounting seat 180 and into the sheath 174. Within the sheath, the mounting bar 164 is received in a shaft clamp 177, which is coupled to the base plate 171 using fasteners 178 and holds the mounting bar 164 in position. The mounting bar 164 can be fixed relative to the base plate 171, with the tapering body 165 rotatable around the mounting bar 164, or the mounting bar 164 can rotate within the opening in the shaft clamp 177, so that the tapering body portion 165 of the flight can rotate relative to the base plate 171.

Figures 11, 12:
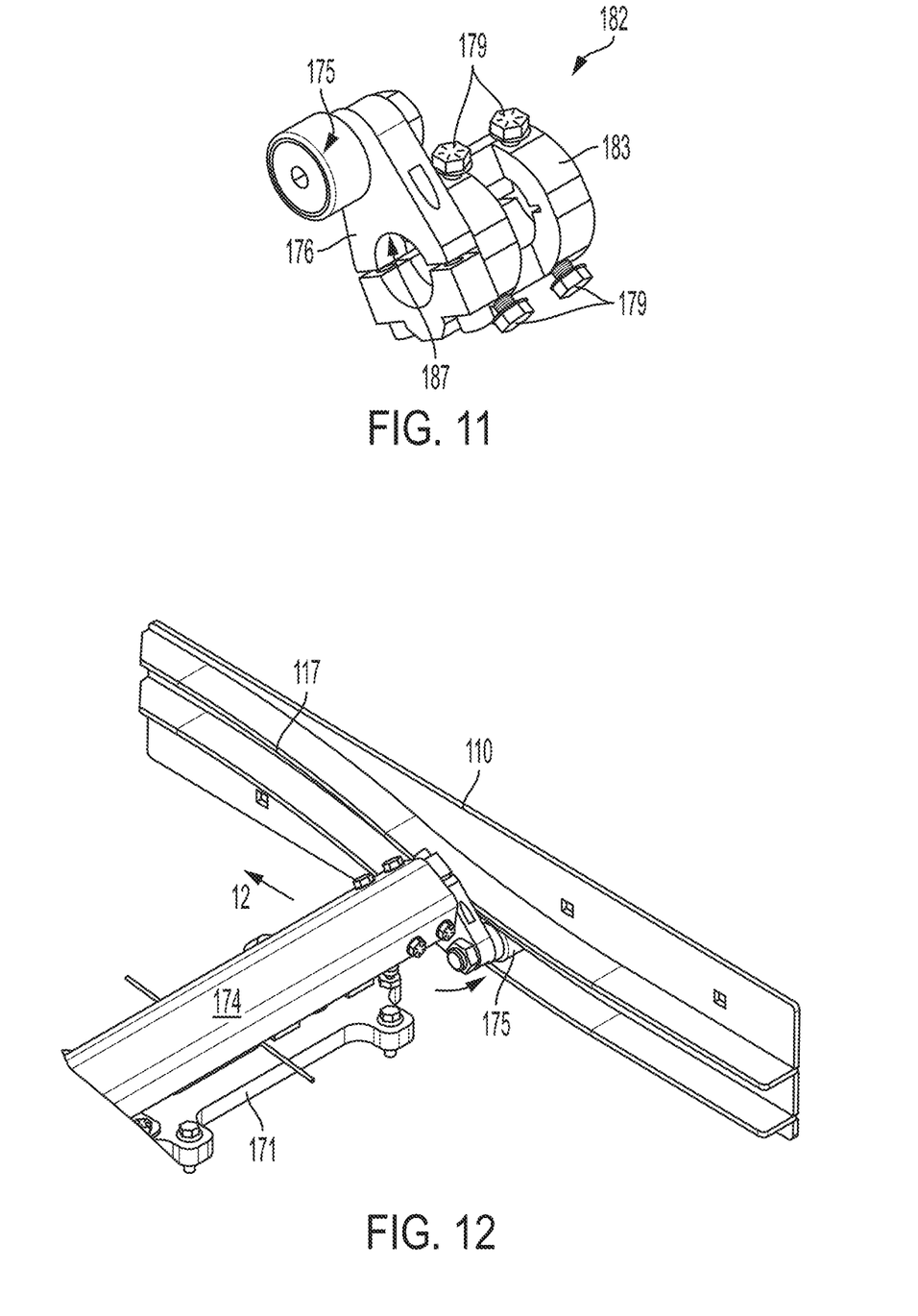
FIG. 11 is an isometric view of a pivoting mechanism of a dynamically assignable flight according to an embodiment of the invention.
FIG. 12 is an isometric view of a flight as it enters a curve in a track in a conveyor frame according to an embodiment of the invention.

At a second end, the illustrative sheath 174 receives a pivot mechanism 182, an embodiment of which is shown in detail in FIG. 11, for selectively pivoting the sheath 174 and connected tapering body portion 165 relative to the mover 133. The pivot mechanism 182 comprises a base 183 that is received in and coupled to the second end of the sheath 174 using fasteners 179. A crank arm 176 at the outer end of the base 183 connects to a cam follower 175 offset from the pivot mechanism base 183 and comprising a cylindrical protrusion, though the invention is not so limited. The pivot mechanism base 183 may be a substantially cylindrical structure configured to clamp onto a camshaft 185 that extends through an opening 187 in the crank arm 176, the base 183 and through a bearing support 186 that extends up from the base plate 171. The illustrative crank arm 176 comprises two pieces that wrap and clamp around the camshaft opening 187 using fasteners, but the invention is not so limited. The end of the camshaft 185 extends through the bearing support 186 and is coupled to a torsion spring 192 or other biasing mechanism for biasing the flight body 161 to a default position. The illustrative torsion spring 192 biases the flight body to a substantially horizontal position when the flight 160 travels below the carryway along the returnway of the conveyor belt.

The illustrative mounting portion 162 of the flight 160 may further include protrusions 194 extending from the base plate 171 directly below the edges of the sheath 174. The protrusions 194 form mechanical endstops that prevent the flight 160 from overrotating.

As shown in FIGS. 9 and 12, the conveyor frame 110 includes a track 117 configured to receive the cam follower 175. The cam follower 175 engages the track 117 of the frame to control the rotational position of the flight body 161. The track 117 can rise at the end of the carryway, raising the cam follower 175 and causing the sheath 174 and connected tapering portion of the flight body 165 to rotate relative to the base plate 171 and attached mover 133, as shown in FIG. 12.

Figure 13:
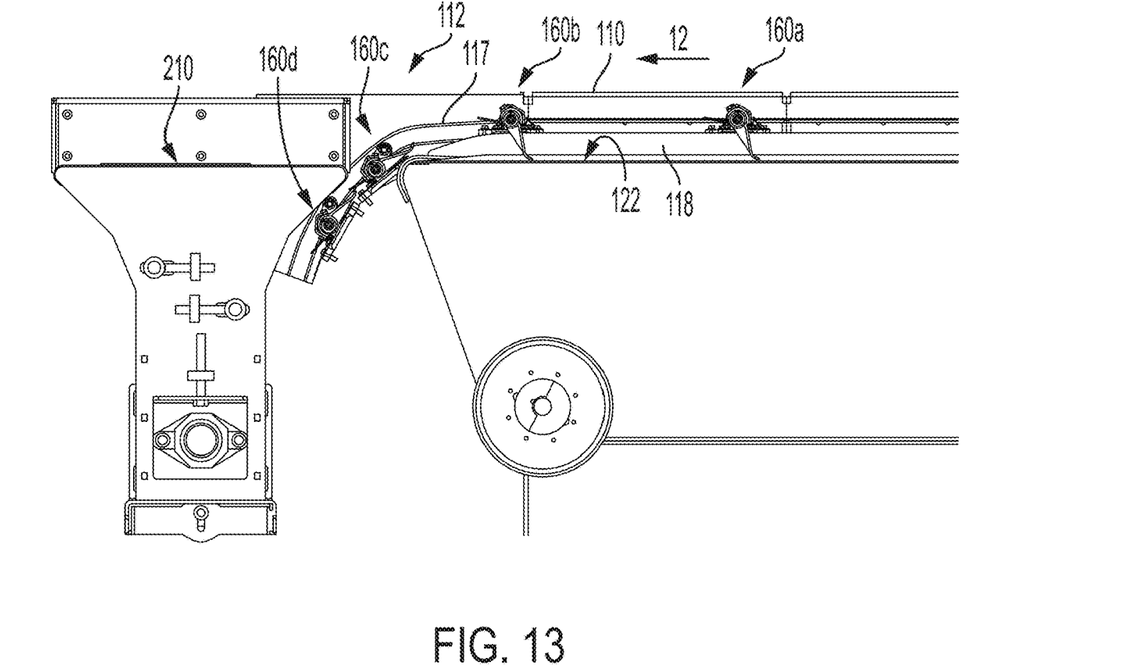
FIG. 13 is a cross-sectional side view of the conveyor system of FIG. 1 near an end of the carryway.
Figure 14:
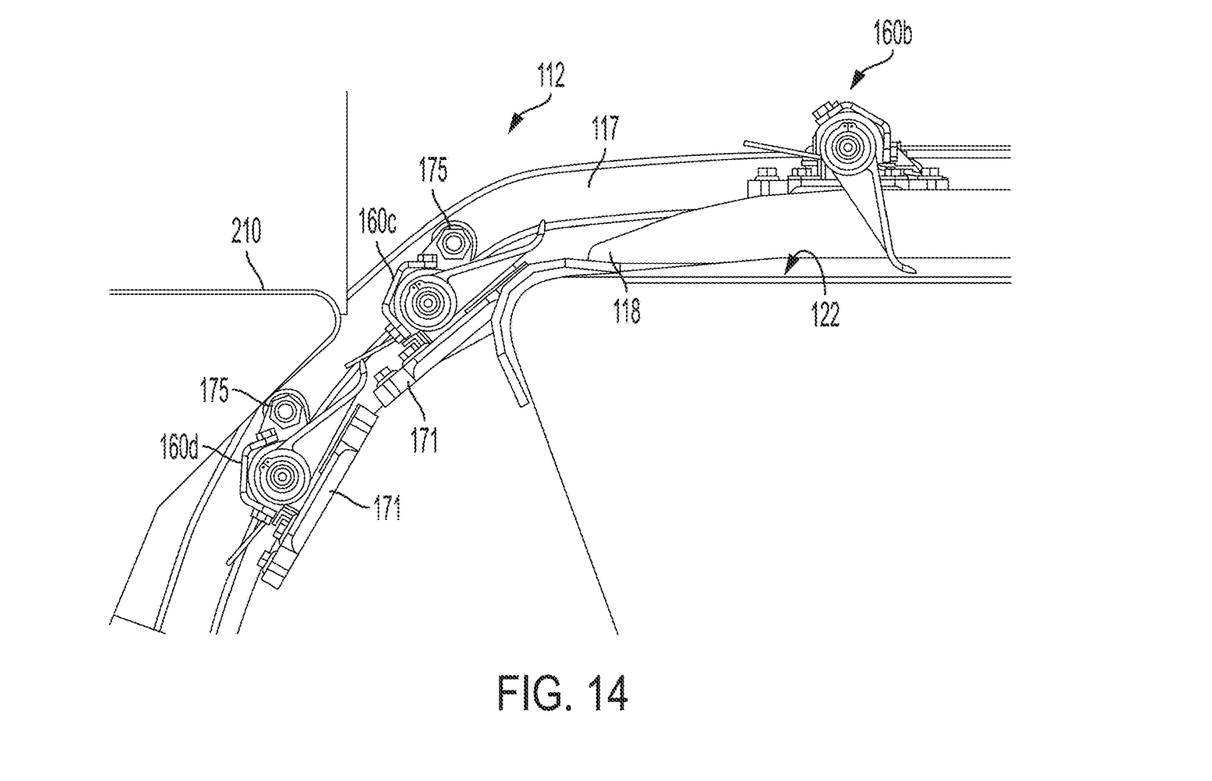
FIG. 14 is a detailed cross-sectional side view of the conveyor system of FIG. 1 near an end of the carryway.

Referring to FIGS. 13 and 14, as the dynamically assignable flights 160 approach the end 112 of the conveyor carryway, the track 117 curves to decrease the distance between the track and engaged cam follower 175 and the conveyor surface 122. As shown, a side rail 118 of the frame tapers at the end of the carryway as well. Prior to the curve, the track 117 holds a flight 160a, 160b in the active conveying position, as described above, as the travel in the direction of belt travel 12. In the curve, the track 117 causes the cam follower 175 to move up relative to the base plate 171, causing the flights 160c, 160d to rotate and push the flight body 165 into a non-active position substantially parallel to the base plate 171, allowing the flight to fit into a space between the end 112 of the carryway and an output conveyor 210 or other receptacle for the conveyed objects. The flights can remain in the non-active position through the returnway of the rail, which in the illustrative embodiment is below the carryway, but the invention is not so limited.

Figure 15:
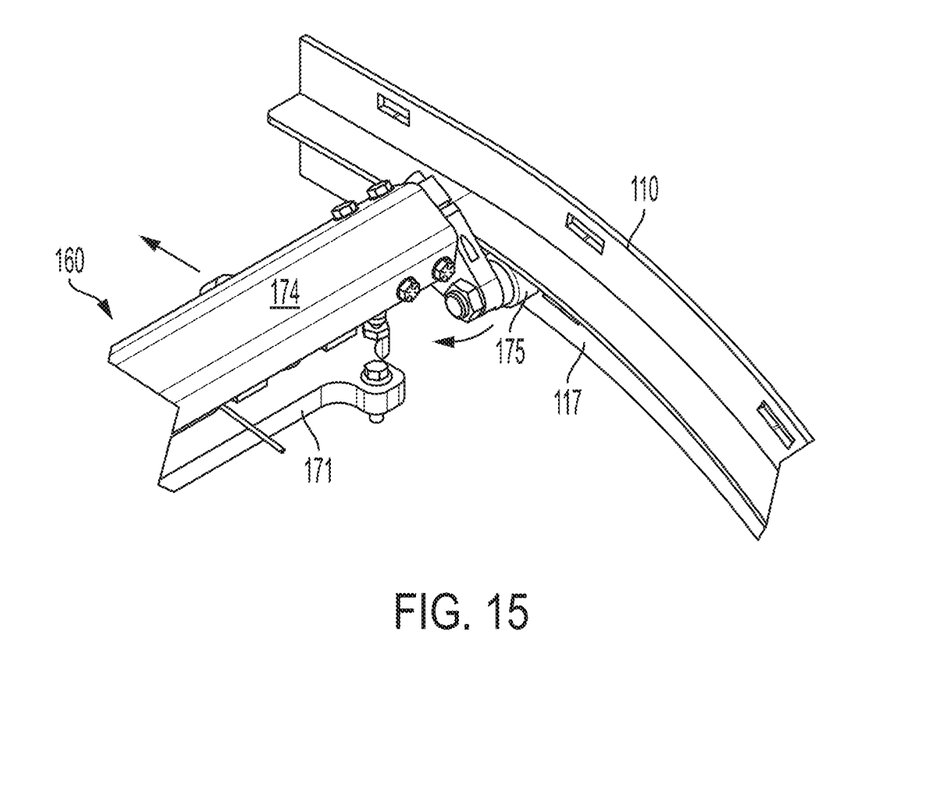
FIG. 15 is an isometric view if an outside portion of a dynamically assignable flight and conveyor track as the track pushes the flight into an active position at a beginning of a carryway according to an embodiment of the invention.

As shown in FIG. 15, the track 117 can push the flight 160 into an active position at the beginning of the carryway by moving the cam follower 175 down relative to the base plate 171 to rotate the mounting portion and attached body portion down about the camshaft and mounting bar and into the active position.

Figure 16:
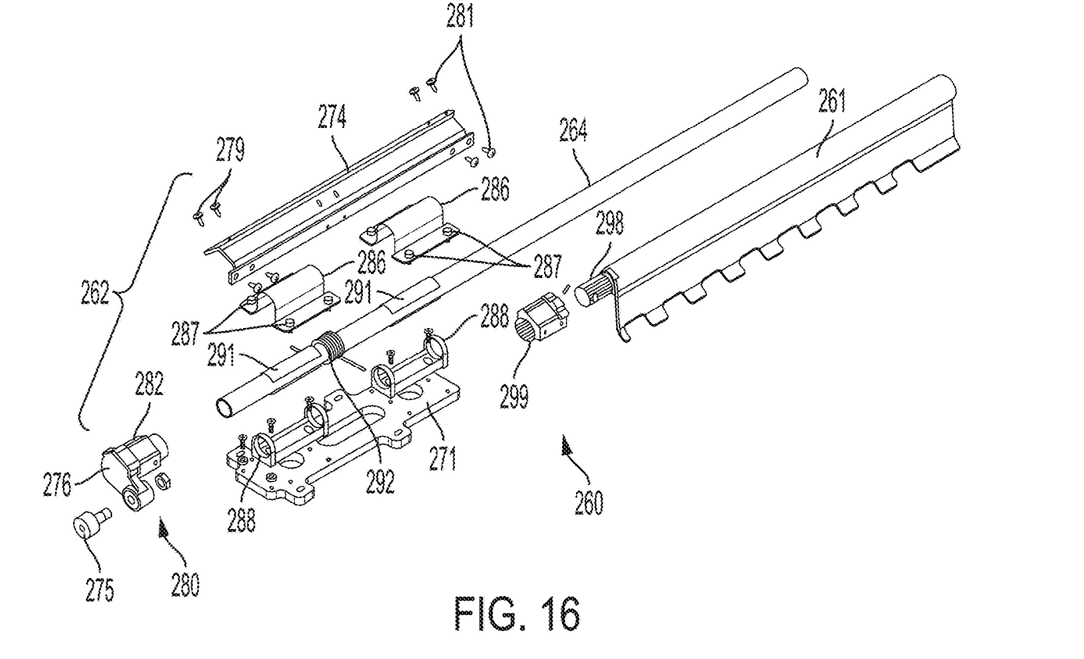
FIG. 16 is an exploded view of a dynamically assignable flight according to another embodiment.

Referring to FIG. 16, in another embodiment, a dynamically adjustable flight 260 for a conveyor includes body portion 261 and a mounting portion 262 that connects the body portion 261 to a mover of a linear transport system. The illustrative body portion 261 is similar to the body portion 161 described above.

The mounting portion 262 comprises a base plate 271 for mounting the flight assembly 260 to a mover using fasteners inserted through aligned openings or another suitable fastening mechanism, as described above. A sheath 274 formed of bent sheet metal forms a housing that covers and connects the components of the mounting portion 262 to the flight body 261. At a first end, the flight body 261 is fixed to the sheath 274 via a cylindrical protrusion 298 extending from the flight body and cylindrical adapter 299 that receive fasteners 281 extending through openings in the sheath 274. At a second end, the sheath 274 connects to a cam assembly 280 via fasteners 279. A mounting bar 264 extends through the base of the flight portion 261, the protrusion 298 and adapter 299 and between the sheath 274 and base plate 271. The mounting bear 264 is rotatably received in an opening in the cam assembly 280 at a second end using a bearing or other suitable mechanism. Clamps 286 cover the mounting bar 264 and are connected to the base plate 271 via fasteners 287 to prevent interference with the rotatable sheath 274. Mounting bar cradles 288 receive and control the position of the mounting bar 264. The illustrative mounting bar 264 further includes wrappings 291 made of urethane or another suitable material for distributing forces evenly on the mounting bar, promoting smooth operation and dampening vibrations, but the invention is not so limited.

A torsion spring 292 wrapped around the mounting bar 264 and having legs extending between the sheath 274 and base plate 271 biases the flight body to a default position. The illustrative torsion spring 292 biases the flight body to a substantially horizontal position when the flight travels below the carryway along the returnway of the conveyor belt. Other suitable biasing mechanisms may be used.

The illustrative cam assembly 280 includes a body comprises a base 282 that rotatably receives the mounting bar 264. A crank arm 276 at the outer end of the base 286 connects to a rotatable cam follower 275 offset from the base and comprising a cylindrical protrusion that is rotatable relative to the base to prevent or reduce wear, though the invention is not so limited.

When the cam follower 275 is induces to move up or down via a track or other guide, the attached sheath 274 and flight body 261 rotate about the mounting bar 264, as described above.

Figure 17:
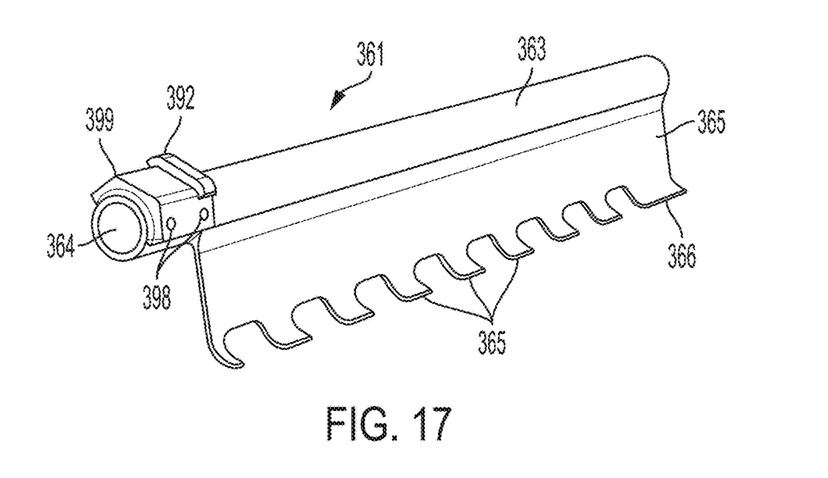
FIG. 17 is an isometric view of a flight body according to another embodiment.

FIG. 17 shows another embodiment of a flight body 361 includes an integral adapter 399 for connecting the flight body to a sheath or other means for pivotally mounting the flight to a mover. The adapter 399 extends from a base 363 that receives a mounting bar. The adapter 399 has an outer surface configured to be received in an associated sheath, as described above, and including openings 398 for receiving fasteners. An outer surface projection 392 forms a stop for the sheath. An inner opening 364 rotatably receives a mounting bar. The flight body 361 further includes a tapering body portion 365 having a curved tip 366 forming spaced-apart fingers 365, as described above.

Any suitable means for pivotally connecting a flight body to a mover may be used, and the invention is not limited to the configurations described above. For example, the cam portion may be located in a different location, or have a different configuration. Motors, magnets or other inducers may also be used to effect pivoting of the flight body to allow the flight to fit between an outfeed and a receptacle of the conveyor. Other variations may be made without departing from the scope of the invention.

The invention has been described relative to certain illustrative embodiments. Those skilled in the art will appreciate that the present invention may be implemented in a number of different applications and embodiments and is not specifically limited in its application to the particular embodiments depicted.

What is claimed is:

1. A flight for a conveyor comprising:
a flight body rotatably mounted on a mounting bar;
a mounting assembly receiving the mounting bar to pivotally mount the flight body to a mover of a linear transport system; and
a pivot mechanism for selectively pivoting the flight body relative to the mover.

2. The flight of claim 1, wherein the mounting assembly comprises:
a base plate configured to be fastened to the mover;
a sheath having a first end connected to the flight body and a second end connected to the pivot mechanism; and
a clamp within the sheath for receiving the mounting bar and fixing the mounting bar relative to the base plate.

3. The flight of claim 2, wherein the pivot mechanism comprises:
a crank arm connected to the sheath; and
a cam follower protruding from the crank arm and offset from the mounting bar, so that movement of the cam follower causes the flight body to rotate about the mounting bar.

4. The flight of claim 3, wherein the mounting assembly includes a biasing mechanism for biasing the flight body to a default position.

5. The flight of claim 3, wherein the mounting bar extends through the mounting assembly and is rotatably received in the pivot mechanism.

6. The flight of claim 1, wherein the flight body includes a tubular base for receiving the mounting bar.

7. The flight of claim 6, wherein the flight body further includes:
a tapering body portion extending from the tubular base, the tapering body portion having a front surface and a rear surface; and
a curved tip extending from the rear surface.

8. The flight of claim 7, wherein the curved tip of includes a plurality of openings to form fingers.

9. A flight for a conveyor comprising:
a mounting bar;
a tubular base pivotally mounted on the mounting bar;
a tapering body portion extending from the base having a front surface and a rear surface;
a curved tip extending from the rear surface; and
an adapter extending from the base including a central opening for receiving the mounting bar and openings for receiving fasteners to fasten the flight to a mounting assembly.

10. The flight of claim 9, wherein the curved tip including openings in a terminal edge to form fingers.

11. A flight for a conveyor comprising:
a base;
a body portion extending from the base having a front surface and a rear surface;
a curved tip extending from the rear surface including openings in a terminal edge to form fingers;
a mounting bar extending through the base;
a clamp for receiving the mounting bar and fixing the mounting bar to a base plate connected to a mover of a linear transport system.

12. The flight of claim 11, wherein the body portion tapers from the base to the curved tip.

13. The flight of claim 12, wherein the base is tubular.

14. The flight of claim 11, further comprising a pivot mechanism for selectively pivoting the body portion relative to the mover.

15. The flight of claim 14, further comprising:
a sheath having a first end connected to the body portion and a second end connected to the pivot mechanism, wherein the sheath covers the clamp.

* * * * *

UNITED STATES PATENT AND TRADEMARK OFFICE
CERTIFICATE OF CORRECTION

PATENT NO. : 12,139,350 B2  
APPLICATION NO. : 18/376263  
DATED : November 12, 2024  
INVENTOR(S) : Matthew L. Fourney et al.

Page 1 of 1

It is certified that error appears in the above-identified patent and that said Letters Patent is hereby corrected as shown below:

In the Claims

Column 8, (Line 31) Claim 8 should read: The flight of claim 7, wherein the curved tip includes a plurality of openings to form fingers.

Column 8, (Line 43) Claim 10 should read: The flight of claim 9, wherein the curved tip includes openings in a terminal edge to form fingers.

Signed and Sealed this  
Thirty-first Day of December, 2024

Derrick Brent  
*Acting Director of the United States Patent and Trademark Office*